United States Patent [19]
Cormier et al.

[11] Patent Number: 5,461,721
[45] Date of Patent: Oct. 24, 1995

[54] SYSTEM FOR TRANSFERRING DATA BETWEEN I/O DEVICES AND MAIN OR EXPANDED STORAGE UNDER DYNAMIC CONTROL OF INDEPENDENT INDIRECT ADDRESS WORDS (IDAWS)

[75] Inventors: Roger L. Cormier, Pleasant Valley; Robert J. Dugan, Hyde Park; Kenneth J. Fredericks; Peter H. Gum, both of Poughkeepsie; Moon J. Kim, Wappingers Falls; Allen H. Preston, Poughkeepsie; Richard J. Schmalz, deceased, late of Wappingers Falls, by Mary I. Schmalz, administratix; Charles F. Webb; Leslie W. Wyman, both of Poughkeepsie, all of N.Y.

[73] Assignee: International Business Machines Corporation, Armonk, N.Y.

[21] Appl. No.: 46,679

[22] Filed: Apr. 14, 1993

[51] Int. Cl.[6] .............................. G06F 12/08; G06F 12/10
[52] U.S. Cl. .......................... 395/275; 395/400; 364/254.8; 364/255.1; 364/261.2; 364/DIG. 1
[58] Field of Search ....................... 395/425, 275, 395/400, 250, 375

[56] References Cited

U.S. PATENT DOCUMENTS

| | | | |
|---|---|---|---|
| 3,839,706 | 10/1974 | Borchsenius | 395/400 |
| 4,272,815 | 6/1981 | Kadowaki et al. | 395/250 |
| 4,368,513 | 1/1983 | Meltzer | 395/425 |
| 4,855,936 | 8/1989 | Casey et al. | 364/521 |
| 5,095,420 | 3/1992 | Eilert et al. | 395/400 |
| 5,237,668 | 8/1993 | Blandy et al. | 395/400 |
| 5,367,661 | 11/1994 | Hough et al. | 395/500 |

*Primary Examiner*—Thomas C. Lee
*Assistant Examiner*—Felicia Ives
*Attorney, Agent, or Firm*—Bernard M. Goldman

[57] ABSTRACT

Enables an I/O channel program to use IDAWs (indirect data address words) to control data transfers from/to an I/O (input/output) device to/from either or both of ES (expanded storage) and/or system MS (main storage), in which data moved to/from ES does not move through MS. ES and MS are plural electronic storage media in a data processing system, and the I/O device is any I/O device selectable by the system. Intermixing of data transfers between ES and MS may be controlled by a single IDAW list accessed by a channel control word (CCW) in a channel program in a data transfer direction indicated in the CCW without any channel mode change.

18 Claims, 9 Drawing Sheets

DISK TRACK DATA

CHANNEL PROGRAM

| | | |
|---|---|---|
| H0 | READ | CCW 0 |
| | SPEC | CCW 1 |
| R0 | READ | CCW 2 |
| | TIC | CCW 3 |
| H1 | READ | CCW 4 |
| | SPEC | CCW 5 |
| R1 | READ | CCW 6 |
| | TIC | CCW 7 |
| H2 | READ | CCW 8 |
| | SPEC | CCW 9 |
| R2 | READ | CCW 10 |

NEW CHAN. PROG. OF PREFERRED EMBODIMENT

SYSTEM FOR TRANSFERRING DATA BETWEEN I/O DEVICES AND MAIN OR EXPANDED STORAGE UNDER DYNAMIC CONTROL OF INDEPENDENT INDIRECT ADDRESS WORDS (IDAWS)

INTRODUCTION

The invention relates to a method and means for enabling an I/O channel program to use IDAWs (indirect data address words) to control data transfers from/to an I/O (input/output) device to/from either or both of ES (expanded storage) and/or system MS (main storage), in which data moved to/from ES does not move through MS. ES and MS are electronic memories in a data processing system, and the I/O device is any I/O device selectable by the system.

BACKGROUND

Current data processing systems using the S/390 architecture directly transfer data between I/O and MS. But they only indirectly transfer data between I/O and ES, which involves an I/O-MS transfer controlled by an I/O channel processor, and an MS-ES transfer controlled by a central processor (CPU) or by a data mover (ADM) using a channel processor.

An example of an ES to I/O data transfer occurs when ES storage space is to be freed up by moving pages of data out of ES to I/O. An example of an I/O to ES transfer occurs when a system is more efficiently operated by moving data pages into its fast ES electronic storage from slower electromechanical I/O devices, so that the system can quickly access the data in ES.

Under current S/390 architecture, channel programs comprise CCWs (channel control words) and IDAWs (indirect data address words), and channel programs can only control data transfers to/from MS.

A CPU page-in instruction and a page-out instruction for synchronously controlling ES/MS data transfers are disclosed and claimed in U.S. Pat. No. 4,476,524 to Brown et al using real addressing in MS, which is assigned to the same assignee as the subject application. A move page (MVPG) instruction for synchronously controlling ES/MS data transfers, and capable of using virtual addresses in MS, is disclosed and claimed in U.S. Pat. No. 5,237,668 by Blandy et al., published Aug. 19, 1993, filed Oct. 20, 1989. Also, transfers between ES and MS may be asynchronously controlled by a CPU using request-response instructions of the type disclosed and claimed in U.S. Pat. No. 5,386,560 by McCauley et al., published Jan. 31, 1995, entitled "Split Instruction Paging Method and Means". Another proposal is found in a European patent application 0 214 870 having priority date of Dec. 9, 1985.

Channel programs have been proposed for controlling transfers of data between ES and MS as in U.S. Pat. No. 4,476,524 to Brown et al using real addressing, and in U.S. patent application Ser. No. 07/816917 filed Jan. 3, 1992 by Dewkett et al entitled "Asynchronous co-processor method and means", now abandoned Jun. 15, 1995.

Data transfers between I/O and ES without passing through MS are understood to be proposed in a Japanese patent specification number 62-212744 published, on Sep. 18, 1987, which (as best can be understood from an English abstract of the specification, and its drawings) discloses a specific prescribed channel-command-word (CCW) to control a direct transfer of data from an external memory device to ES (expanded storage). A control bit is provided in a start subchannel operation to indicate that the specific prescribed CCW is used in a channel program addressed by the subchannel in MS to control a direct data transfer from an external memory device to ES. The specific prescribed CCW, itself, does not specify any data transfer, but it only specifies a change of mode in the channel program to enable subsequent CCWs in the channel program to access ES. Only CCW(s) which follow the specific prescribed CCW in the channel program can specify data transfers between the external device and ES. Before a later data transfer to MS may be made by the external device, the subchannel mode must again be changed to MS mode, which may perhaps be done by using a conventional transfer-in-channel (TIC) CCW that transfers channel control to another channel program which may be non-contiguous in MS with its preceding channel program. Then, such a TIC CCW is followed by conventional CCWs that specify data transfers between the external device and MS.

Accordingly, the Japanese specification is understood to require a subchannel to switch mode (to either ES mode or MS mode) in a different channel program in order to enable an I/O-ES transfer or an I/O-MS transfer. Switching modes for different channel programs involves additional channel overhead and reduces system performance. The Japanese patent does not use any indirect-data-addressing words (IDAWs) in its ES transfer controls.

SUMMARY OF THE INVENTION

The subject invention does not use the specific prescribed command disclosed in Japanese specification number 62-212744. The invention provides a different and more efficient method and means for controlling a direct transfer between I/O and ES than is provided in this Japanese specification. The invention does not require any new channel commands, but requires one or more control bits in an existing operation request block (ORB) addressed by a start subchannel (SSCH) instruction executed by a central processor. The SSCH execution requests an I/O subsystem to select and start a channel processor to execute a channel program that performs the I/O access requested by the central processor.

However, this invention may increase its addressability in ES by modifying current channel commands to enable both block and byte addressing in ES. This may be done by modifying current read and write channel commands by adding a count modifier field therein to control byte/block addressing in ES and in MS for the respective CCW and by one or more IDAWs in an IDAW list addressed by the CCW.

This invention enables each IDAW to make an independent selection of the electronic medium (ES or MS) to be accessed for its data transfer. Further, this invention expands the addressing capabilities to byte and block addressing within the medium selected by an IDAW. Prior IDAWs in the IBM S/390 I/O architecture can only perform byte addressing in MS, and cannot access ES.

This IDAW change by the invention enables each IDAW to switch to either the ES or MS medium, regardless of whether the prior IDAW specified an ES or MS access. Thus, each next IDAW in an IDAW list can make a switch, or can continue, (without any prior IDAW dependency) to control a data transfer between I/O and the same or the other of the ES/MS media. Then each next I/O access specified in a channel program can make an independent selection between ES and MS. Then, the next data read from an I/O device can be transferred to either the other of, or to the same of, MS or ES independently of the selection of MS or ES in any preceding IDAW. Likewise, each next IDAW in an IDAW list can switch the next data write on an I/O device either to receive data from the other of, or from the same of, MS or ES independently of the selection of MS or ES in any preceding IDAW. Thus with this invention, there is no mode dependency on any prior IDAW.

A feature of this invention is the provision of an ES/MS control bit in each IDAW, which enables independent ES/MS specification by each IDAW, without involving any ES/MS mode use in the channel commands in the associated channel program.

A commonly-used example is with data base systems stored on disk tracks, in which each record may have a 4 KiloByte data portion and have a 64 byte header control portion. The records may be block recorded in a disk track. The 64 byte header contains information about the associated record, and is used by a program to determine any action to be taken with the associated 4 KB data portion. Such a program may require the 64 byte header to be read into MS for processing, but may not need the associated 4 KB data record which may remain in ES when it is not needed for processing (which occurs most of the time with most of the records in the data base). Accordingly, only the 64 byte portions must be read into MS, and the 4 KB data records can be efficiently read into ES where they may remain dormant but are quickly accessible to the program whenever needed. In this environment, the system operates most efficiently if the channel program can alternately switch its I/O data transmissions between MS (which receives the 64 byte headers) and ES (which receives the 4 KB data records).

This invention enhances the efficiency of the channel programs and adds to the functions of ES, as is apparent from the following objects of the invention. It is an object of this invention to:

1. Reduce data traffic between I/O devices and system main storage.
2. Eliminate the use of main storage as an intermediate buffer for data transfers between I/O. This will reduce the use of MS for transferring ES data traffic.
3. Free MS for execution use by the processors in a system.
4. Provide asynchronous data transfers between I/O and ES.
5. Provide asynchronous execution of I/O—ES channel code to replace the present need for:
   A. channel code for I/O—MS data movement for controlling I/O—ES data movement.
   B. processor code for controlling MS—ES and ES—ES data movement.
   C. processor code to coordinate the I/O—MS data movement with MS—ES data movement.
6. Allow the intermixing of MS and ES references within a single IDAW list of a channel program, to enhance the performance of a storage hierarchy of a data processing system by providing an I/O channel ability to do separate ES and MS data transfers in a single DASD operation.
7. Enable an increase in the efficiency of a data processing system used as a file server for a data network system by:
   A. Freeing up central processor cycles from being significantly involved in network server operations by a system and by instead using channel processor cycles.
   B. Freeing up MS cycles for central processor use by the reduction or elimination of MS as a repository of data being transferred between I/O and a network. Instead, network data is deposited in ES, which may be accessed by channel processors in parallel with CPU accesses to MS.

The invention uses an IDAW list located by a channel command word (CCW) in an I/O channel program. The program may have any number of its CCWs respectively associated with lists of IDAWs. Only predetermined types of CCWs may have associated IDAW lists. To have an associated IDAW list, a CCW has an IDAW control bit set on, which indicates an address field in the CCW locates the associated IDAW list.

The ability to have IDAWs control the accessing of both MS and ES is indicated by a control field in a control block accessed in the process of locating the channel program containing the IDAWs. For example, an operation request block (ORB) accessed by a start subchannel instruction (SSCH) may have a field that indicates that the associated channel program may have IDAWs that access both MS and ES.

This invention also puts an MS/ES control field in each IDAW in an IDAW list to indicate whether each IDAW control an access to MS or ES. Putting the MS/ES control field in each IDAW enables the channel program to control an intermixing of MS and ES accesses in the SAME IDAW list controlled by a single CCW. If the MS/ES control field were not in each IDAW (but are indicated outside of the IDAWs), the intermixing of MS and ES accesses in same list may not be done, wherein all IDAWs in the list may be required to access the same electronic memory. Intermixing MS/ES accesses in the same list reduces channel performance time and channel program overhead.

Also, another control field in the same control block (accessed in the process of locating the channel program containing the IDAWs) may indicate the size and form of the address field(s) in associated IDAWs. In this manner, this invention expands the types of IDAWs available in a system for moving data directly between I/O and MS or ES. For example, a control field in the ORB may specify whether any associated IDAWs are small IDAWs (e.g. 32 bit size) or large IDAWs (e.g. 64 bit size) to be used, and may further specify if large IDAWs have byte addressing or only block addressing in MS and/or in ES. This facility increases the functions performable by a channel program.

The IDAWs in an IDAW list are executed in the sequence of IDAWs in the list after the associated CCW is executed. The number of IDAWs executed in the IDAW list is determined by a one or more fields in the CCW. Each executed IDAW controls the transfer of part or all of a single block between an I/O device and either MS of ES. The MS/ES control field in each IDAW is provided by this invention to specify whether an address field in the IDAW is to be interpreted as containing an MS or ES address.

Thus, having the MS/ES control field in each IDAW enables a channel program to control intermixed MS and ES accesses by the same IDAW list. An alternative to providing an MS/ES control field in each IDAW is to provide an MS/ES control field in the CCW designating the list to indicate all address fields in all IDAWs in the list contain either an MS or an ES address. This alternative eliminates the MS and ES intermixing capability in the same IDAW list.

In a system using virtual storage, an operating system (OS) may need to allocate and pin page frames assigned for CCW/IDAW use in MS and/or ES prior to executing a channel program having the CCW/IDAWs.

When much I/O accessing and little or no processing are needed on data accessed from I/O (such as by a local area network server), this invention enables ES to be used instead of MS, and eliminates most of the network need for using MS. Then, MS can be used for processing by the system central processor without interference from I/O accesses for the LAN network. This enables work of the system to be significantly divided between CPU execution work done in MS, and network work done in ES. Hence the invention enables MS use to be significantly limited to that of an execution memory for the CPUs. Then ES may provide an ideal data buffer between system DASD one or more networks in a client/server environment.

Accordingly, the invention provides improvements in system utilization of MS and ES to improve the price-performance of a computer system. In particular, the invention allows a system to be more efficiently used as a file server for transferring large amounts of data between DASD and a network through ES, bypassing MS while it is being used primarily as a processor execution storage.

EXAMPLES OF ES/MS SWITCHING

Figures 1A, 1B:
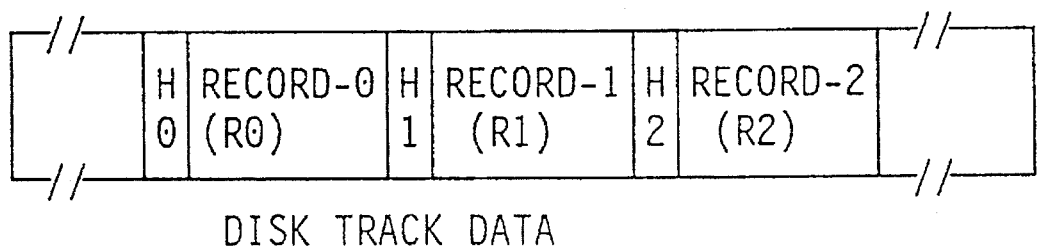
FIG. 1A shows part of a block of records recorded in a disk track on a DASD (direct access device).
FIG. 1B represents a channel program using the specific prescribed commands in a prior Japanese specification. The channel program includes conventional channel command words (CCWS) that read the disk data shown in FIG. 1A into MS and ES.
Figure 1C:
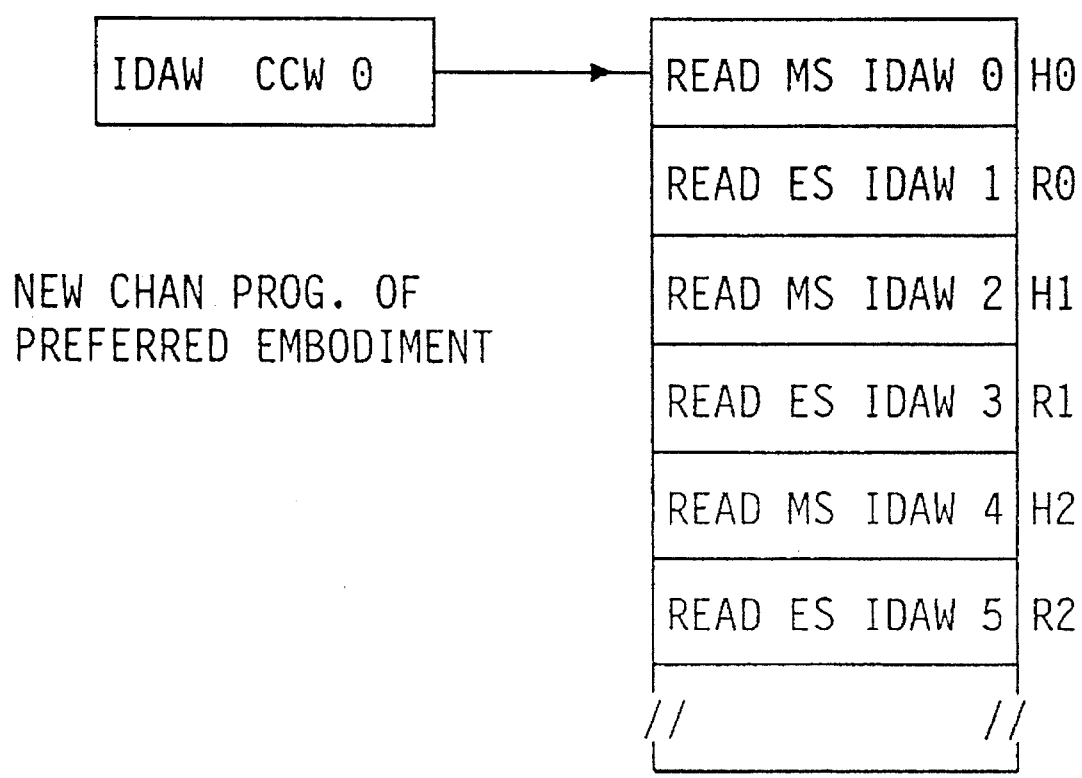
FIG. 1C represents a novel and smaller channel program using the present invention to read the same disk data shown in FIG. 1A into MS and ES.

Examples of the alternate switching of I/O transmitted data between MS and ES its programming operations are represented in FIGS. 1A, 1B and 1C, which together indicate how the operation of the subject invention differs from the operation of the prior Japanese specification and demonstrates advantages of the subject invention over the Japanese specification. FIG. 1A shows three records being read from a block of records recorded in a disk track on a DASD (direct access device). The records are read in the order, record-0 record-1 record-2. The reading of each record is preceded by the reading of header data designated as H0 H1 H2, respectively. The header data provides index information about its immediately following record.

A program for processing these records in a data processing system requires that the header data be located in MS, where the header data is easily used by the program. The records may be located in separate pages in ES, particularly if they have low frequency of use. The header data is accessed by the program for determining which of the records in ES is to be accessed.

FIG. 1B represents a channel program supporting the I/O data example in FIG. 1A. FIG. 1B contains the specific prescribed command disclosed in the Japanese specification, along with conventional channel command words (CCWs) required to read the disk data shown in FIG. 1A into MS and ES, as required. The illustrated example is comprised of 11 CCWs which are needed to control the reading of the three headers H0–H2 and associated records R0–R3 shown in FIG. 1A, and assumes the channel is initially in MS mode; if the channel is initially in ES mode, an additional "specific prescribed CCW" is needed to precede the first illustrated CCW.

In this example, when the channel is in ES mode, an address in a CCW is interpreted as a block address which is located on a block boundary, and it is referred to as an ESBN, ES block number. In this example, each block is a 4 KB page. A CCW controlled data transfer in ES mode will start at the CCW block address in ES. If the channel is in MS mode, a CCW address is interpreted as being to a byte address location in MS; and the data transfer will start at that address in MS.

The example in FIG. 1B puts each next read header sequentially into the same block in MS, and puts each next read record into a different block in ES.

The first illustrated CCW-0 is a "read CCW" that reads the first header, H0, into MS, because the channel is initially assumed to be in MS mode, so that the address in the CCW is interpreted as an MS address. The next CCW-1 is a specific prescribed CCW for switching the channel from MS mode to ES mode, so that the following CCW-2 (a conventional type of read CCW) has its address interpreted as being an ES address. Then CCW-2 reads record-0 into a block location in ES.

The next read data, header H1, requires the channel to be in MS mode. To do this, it is assumed that the next CCW-3 in FIG. 1B is a conventional TIC CCW (transfer-in-channel CCW) which would put the channel in MS mode. Then the following CCW-4 is a "read CCW" that would transfer the next read header, H1, into MS at the MS location contained in CCW-4. Since the channel is now presumed to be in MS mode, the next CCW-5 is a "specific prescribed CCW" needed to put the channel in ES mode, since the following CCW-6 must transfer the next record-1 into a block address in ES.

The alteration between channel MS and ES modes continues for reading the following header/record data into MS/ES. Accordingly, CCW-7 through CCW-10 similarly control the transfer of header H-2 into MS and record-2 into ES, and they may be followed by as many CCWs as are needed to read all of the following header/record data into MS/ES.

The subject invention uses a different technique for reading the same disk data shown in FIG. 1A into the same memory locations in ES and MS as is done by the prior type of channel program in FIG. 1B. With this invention, no MS mode and ES mode, or such mode switching, are used for channel operation. The subject invention has discovered an advantage in using IDAWs to control transfers between MS and ES, in which each IDAW contains an MS/ES control bit V which indicates if address in the IDAW is to access MS or ES. In this example, if V=0 the address field in the IDAW addresses MS. If V=1, the IDAW addresses ES. The CCW may be a conventional read or write CCW that designates an IDAW list, or the read or write CCW may have novel control fields indicating the format of address fields in associated IDAWs (such as to enable byte addresses in ES).

The subject invention, on average, executes only one IDAW per I/O data transfer in a channel program to support the header/record MS/ES alternation represented in FIG. 1A. However it is to be noted that, on average, the technique in the Japanese patent requires execution of about two CCWs per I/O data transfer in a channel program to support the MS/ES header/record alternation, as is indicated in the above description of FIG. 1B.

FIG. 1C illustrates a channel program using the technique of the subject invention for transferring the same I/O data shown in FIG. 1A. In FIG. 1C, the channel program contains only a single CCW-0, which addresses a list of six unique IDAWs in MS. The six IDAWs, IDAW-0 through IDAW-5, control the same channel operations done by the eleven CCWs in the prior channel program illustrated in FIG. 1B. A corresponding performance gain is obtained by the subject invention. The first IDAW-0 reads the first header, H0, into MS. The next IDAW-1 reads the first record, R0, into ES. Then, IDAW-2 reads the second header, H1, into MS. And the next IDAW-3 reads the next record, R1, into ES. Then IDAW-4 and IDAW-5 read H2/R2 alternately into MS/ES, respectively. This type of MS/ES alternation can be provided for as many headers and records as may be read from the I/O device.

DESCRIPTION OF THE PREFERRED EMBODIMENT

Figure 2:
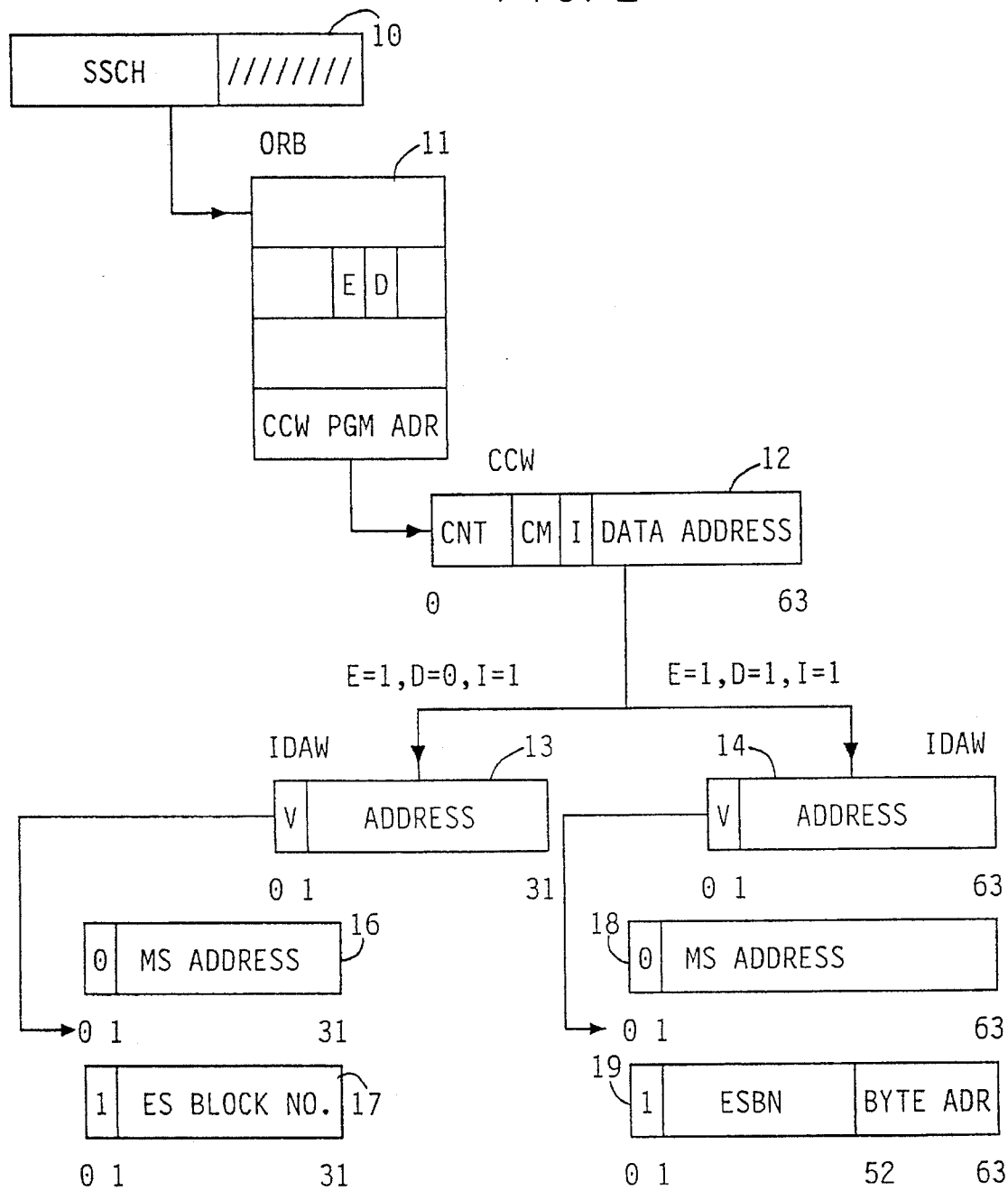
FIG. 2 represents an architectural structure for the preferred embodiment.

FIG. 2 represents the architectural structure used by a preferred embodiment of this invention for enabling a central processor in a data processing system to control an asynchronous transfer of data between an I/O device and either or both of MS or ES. A data transfer is initiated by a central processor executing a conventional start subchannel instruction (SSCH 10), which contains an MS address of an operation request block (ORB 11). ORB 11 contains a CCW program address which locates the first CCW 12 of a channel program in MS and starts the execution of that channel program.

The channel program represented by CCW 12 may actually have any number of CCWs of any type allowed and may include IDAWs. IDAWs are only associated with read CCWs and write CCWs in the channel program which contain an IDAW bit set CCW 12 in FIG. 2 represents the content of a read or write CCW. The operation code (op) in CCW 12 indicates whether the CCW is a read or write CCW. The I bit indicates if an IDAW list is associated with the CCW. If I is 1, the data address field in CCW 12 contains an address which locates an IDAW list in MS. If I is 0, the address field does not locate any IDAW but instead locates a byte address of data in MS.

An IDAW list is a sequence of IDAWs contiguously located in a table in MS that starts at the address in an associated CCW. All of the IDAWs in a list are either read or write IDAWs in accordance with whether the associated CCW is a WRITE or READ CCW respectively. IDAWs located by a write IDAW CCW control a one way transfer of data from an I/O device to either MS or ES (write in MS or ES). IDAWs located by a read IDAW CCW control a one way transfer of data from either MS or ES to an I/O device (read from MS or Es).

The number of IDAWs executed in the IDAW list is determined by a count field (COUNT) in CCW 12, by the address in the CCW, and by a count modifier (CM) in the CCW. If CM is off, the count field contains a byte count; and if CM is on, the count field contains a block count. That is if CM=0, the number of IDAWs executed from the IDAW list is equal to the number of data block(s) located, in part or in whole, between the CCW address and the CCW address plus the CCW byte count. If CM=1, the address in CCW 12 contains a block count, and the number of IDAWs executed from the IDAW list is equal to the block count value in the address field of CCW 12. Commonly, a data block has a 2 KB or 4 KB size.

ORB 11 contains an ES control field (E bit). When the E bit is set to 1, it indicates that the channel program is able to control direct I/O transfers to/from ES, and when E is set to 0 it indicates the channel program can only access MS. Another control bit D in ORB 11 controls the size and form of associated IDAWs. If D is set to 1, the IDAWs are small (e.g. 32 bit) and if D is set to 0 the IDAWs are large (e.g. 64 bit). In this manner, the invention expands the size and types of IDAWs which are available in an IDAW list used by a system for moving data directly between I/O and MS or ES.

Each IDAW 13 or 14 has an MS/ES control field (V) at location 0 in each IDAW in FIG. 2. Having the V bit in each IDAW enables intermixing MS and ES accesses in the same IDAW list. The V field indicates whether the IDAW is to control an access in MS or ES, and operates in combination with the E bit in ORB 11 to control some format characteristics of its IDAW. That is, E must be set to 1 in ORB 11 before the V bit in the IDAWs is usable to control an access in ES. Thus, V=0 in small IDAW 16 specifies that it contains a 31 bit byte address in MS, and V=1 in IDAW 17 specifies it contains a 31 bit ESBN (ES block number). The V=0 in large IDAW 18 specifies that it controls an access in MS and contains a 63 bit byte address, and the V=1 in large IDAW 19 specifies it contains both a 51 bit ESBN and a 12 bit byte address in the block located by that ESBN. Commonly, a data block has a 2 KB or 4 KB size.

The invention uses "read CCWs" and "write CCWs" to designate IDAW lists when their I bit is set to 1. Then the address field in the CCW locates the associated IDAW list in MS. A "read CCW" specifies that all IDAWs in its associated list are to be used to read data in MS or ES, as indicated by the V bit in each IDAW. A "write CCW" specifies that all IDAWs in its associated list are to be used to write data from MS or ES, as indicated by the V bit in each IDAW.

Each IDAW is limited to accessing only part or all of one data block in the memory. If block addressing is specified in an IDAW, an entire block is addressed and accessed on a block boundary in the specified memory. If byte addressing is specified in an IDAW, less than an entire block is accessed if the byte address in the IDAW is not on a block boundary in the specified memory—in which case the access is only to the part of the block from the byte address up to the next block boundary or up to the end of the byte count in the current CCW, whichever occurs first.

Thus in the special case where the associated CCW has a count which does not require accessing more than one block in MS or ES, an associated IDAW list will contain only a single IDAW. This special case is illustrated in FIG. 3 which shows a channel program containing CCW-1, CCW-2 and CCW-3, each associated with one IDAW, Thus, CCW-1 locates IDAW 21 which has an address 0 for starting a data transfer from DASD 24 track 1 to the first 1500 bytes in an ES 4 KB block 26. Then, CCW-2 locates IDAW 22 which has an address 1500 for starting a data transfer from DASD 24 track 2 to the next 500 bytes in an ES 4 KB block 26. Finally, CCW-3 locates IDAW 23 which has an address 2000 for starting a data transfer from DASD 24 track 3 to the last 2000 bytes in an ES 4 KB block 26. The result is that a single block in ES is packed with separate data transfers from three different I/O operations that read data from three different DASD tracks.

IDAWs EXECUTED IN AN IDAW LIST:

Not all of the IDAWs in an IDAW list need to be executed. The number of IDAWs executed in an IDAW list is determined by the count field (COUNT) in the list-locating CCW, by the CCW address field, and by a count modifier (CM) in the CCW. A data transfer ends when the CCW count is completed for the transfer. If CM=0, the CCW count field contains a byte count; and the number of executed IDAWs in the IDAW list is equal to the number of data block(s) located to satisfy the CCW byte count. This is the number of blocks accessed in part or in whole between the CCW address and the CCW address plus the CCW byte count. If CM=1, the CCW count field contains a block count and the CCW address field contains a block number (instead of a byte address); and the number of executed IDAWs in the IDAW list is equal to the value in the CCW block count field.

This invention also expands the types of IDAWs available in a system for moving data directly between I/O and MS or ES. A control field in the ORB specifies if its associated IDAWs are small or large. That is, this invention allows small IDAWs (e.g. 32 bit size) or large IDAWs (e.g. 64 bit size) to be used.

Accordingly, putting an MS/ES control field in each IDAW enables the channel program to control an intermixing of MS and ES accesses in the SAME IDAW list. If the MS/ES control field is not in each IDAW (but is in a location outside of the IDAWs), all IDAWs in the list may be restricted to accessing the same electronic memory.

PROCESSING IDAW CONTROLLED DATA TRANSFERS TO MS & ES:

FIGS. 4A–4E represent a process for using the preferred embodiment. The process is initiated at box 30 in FIG. 4A, which represents the execution by a central processor (CP) of a start subchannel (SSCH) instruction, which accesses a operation request block (ORB) in MS at a location in the SSCH instruction. Then, the CP in step 31 copies information in the ORB into the subchannel identified in the ORB. The subchannel is in a microcoded area of memory accessible only to internal code executed in the CP.

The CP processing of the request represented by the SSCH instruction is then passed to an input/output processor (IOP), which in step 32 puts the SSCH request on an I/O request queue—called making the "subchannel start pending".

In step 33, the IOP checks the validity of the ORB information associated with the request, such as if its program address is within a required part of MS, etc.

Step 34 the IOP selects a channel path processor (from up to 255 channel processors) to handle this SSCH request. Step 35 starts the channel processor operation for the respective request when the selected channel processor is available (not busy). The channel processor takes the request from the queue and starts processing the request by accessing ORB information in the microcode.

Figure 4A:
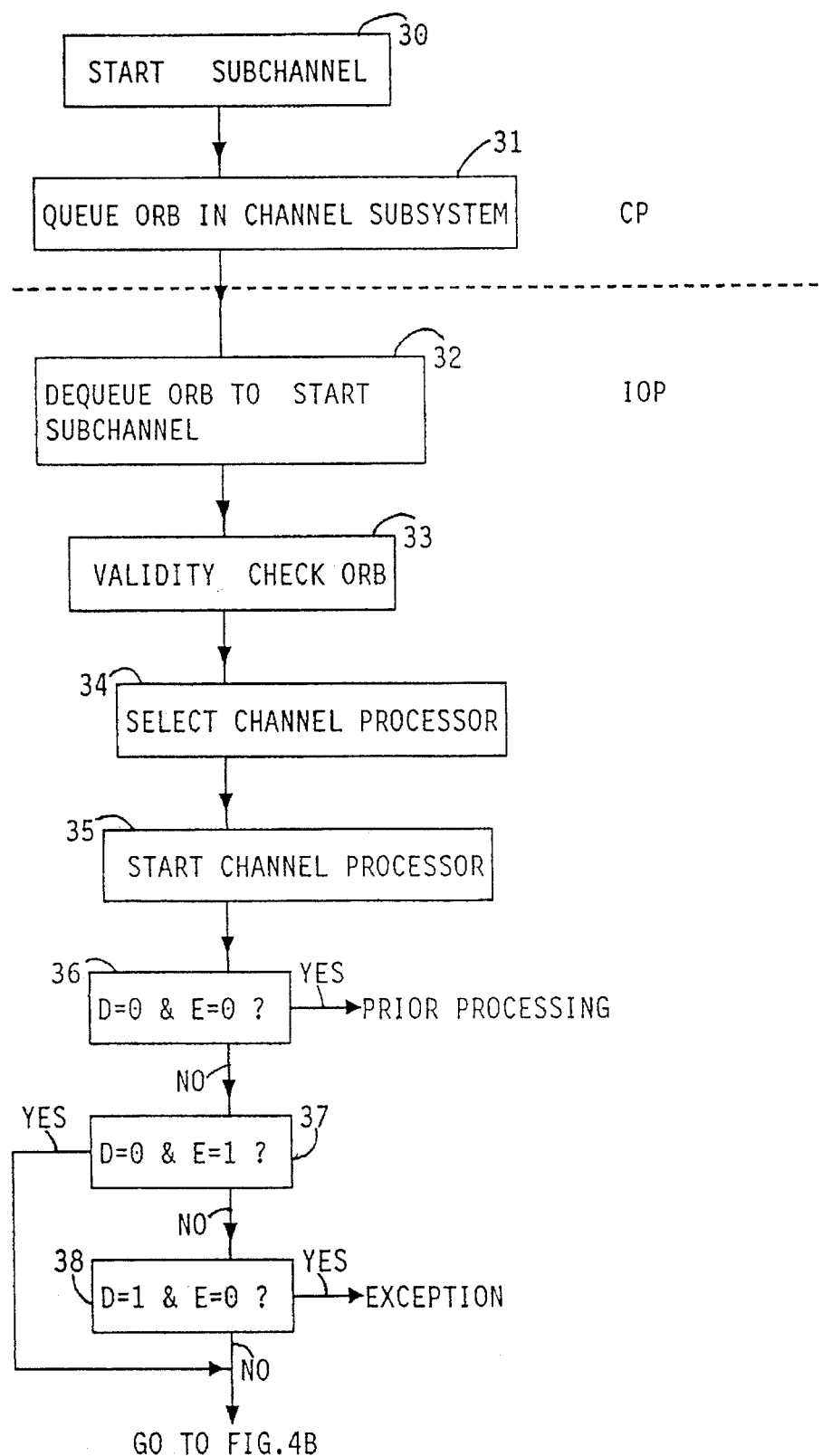
FIGS. 4A, 4B, 4C, 4D and 4E provide a flow diagram of the process used by the preferred embodiment.
Figure 4B:
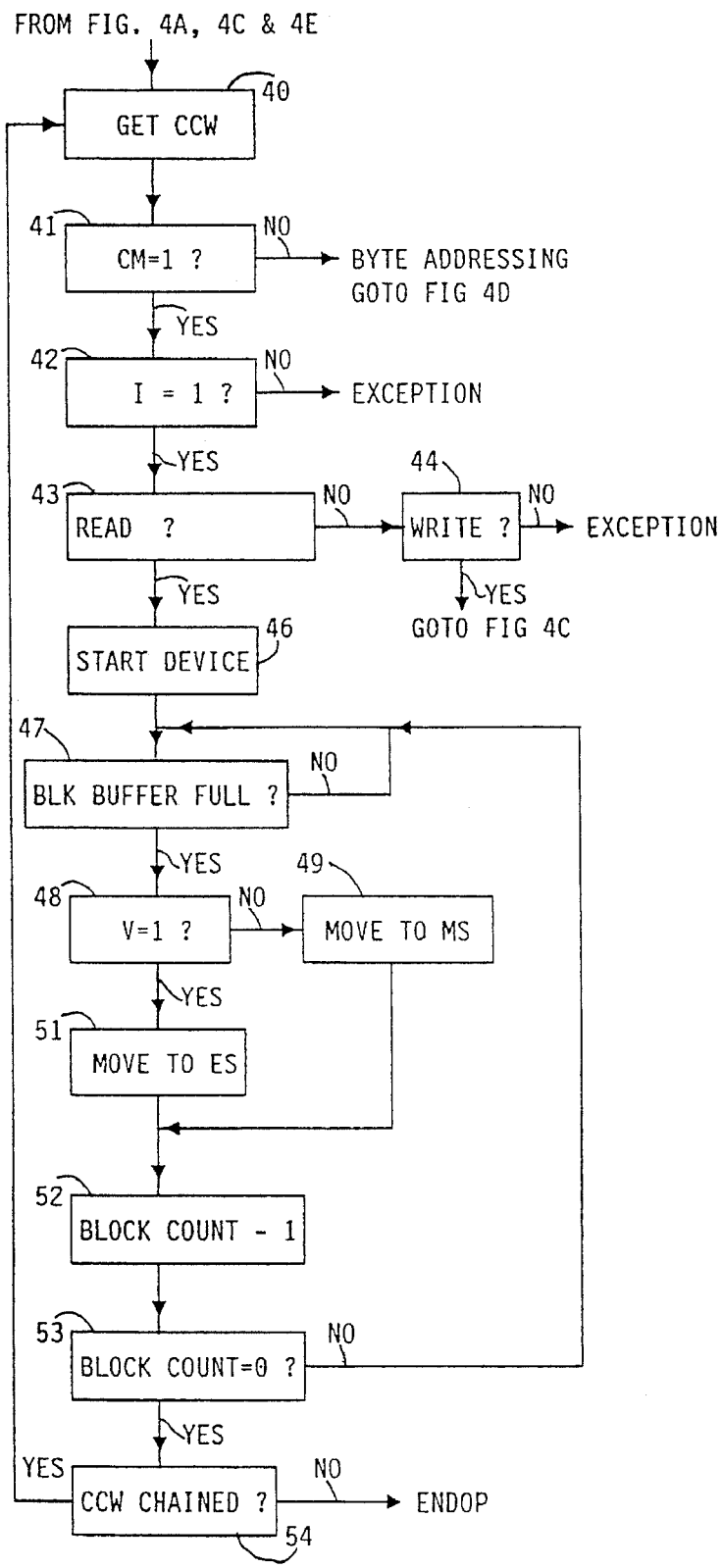

Steps 35, 36, 37 and 38 test the D and E fields in the ORB information to determine how the channel program will operate for the request represented by the ORB information. Step 36 tests if D=0 and E=0; if yes, the effect is as if there are no D and E fields in which case the channel program is processed in the same manner as prior channel programs were processed prior to this invention. If both D=0 and E=0 are not zero, the no path is taken to step 37, which tests if D=0 and E=1. If D=0 and E=1, the process in FIG. 4B is entered. If step 37 does not find D=0 and E=1, the no path is taken to step 38 which tests if D=1 and E=0, which is an improper state that causes an exception signal resulting in a program interruption.

If the combination state of D=1 and E=0 is not found by step 38, the no path is taken to enter FIG. 4B to execute the channel program.

The value in the D field is stored where the processes in FIGS. 4B–E can find it and know if small IDAWs or large IDAWs may be contained in the channel program.

The initial step 40 in FIG. 4B accesses the first CCW located at the beginning of the channel program address by the ORB information in the current request. Next step 41 tests the state of the CM (count modifier) field in the CCW to indicate if the CCW address is a byte value or a block value. If it is a byte value, the CCW contains a byte address and FIG. 4D is entered.

IDAWs WITH BLOCK ADDRESSING:

If step 41 finds CM indicates a block value in the CCW's address field, step 42 is entered to test for a 1 value in the I field in the ORB information in the current CCW. The I=1 state indicates that the address in the CCW locates an IDAW list which may control accesses in ES as well as in MS. Step 43 tests the op code in the current CCW for a read operation. If it detects a read op code, step 46 is entered to have the channel processor send a signal on the channel to start the device. If no read op code is detected, step 44 tests the op code for a write op code. If neither a read or write op code is specified, the no exit from step 44 is taken because no IDAW list can be specified by a CCW other than a read or write CCW; and an exception signal is provided to generate a program interruption. If a write operation is detected, FIG. 4C is entered to continue the process.

In step 46 the channel processor signals the device specified in the ORB information that a read operation is occurring, which is transferring data being read by the device to either MS or ES. Step 47 tests a buffer receiving data read from the I/O device to determine if it is full and is ready to be transmitted to MS or ES. Step 48 represents accessing the next IDAW in the IDAW list (which is initially the first IDAW in the list), and testing the setting of the V bit in the IDAW. If V=0, step 49 transfers the data to MS. If V=1, step 51 transfers the data to ES. After the transfer is completed, step 52 decrements the block count in the CCW, and step 53 tests the resulting value for zero to indicate the CCW operation is completed. If the block count is not zero, step 47 is again entered and the process is repeated for the next block of data read from the I/O device, etc., until step 53 finds the zero count is reached; and then step 54 is entered to test if the end of the channel program has been reached. If it is reached, the process is ended (endop). If not reached, step 40 is entered to obtain the next CCW is accessed in the channel program, and the process repeats until the end of the channel program is reached.

Figure 4C:
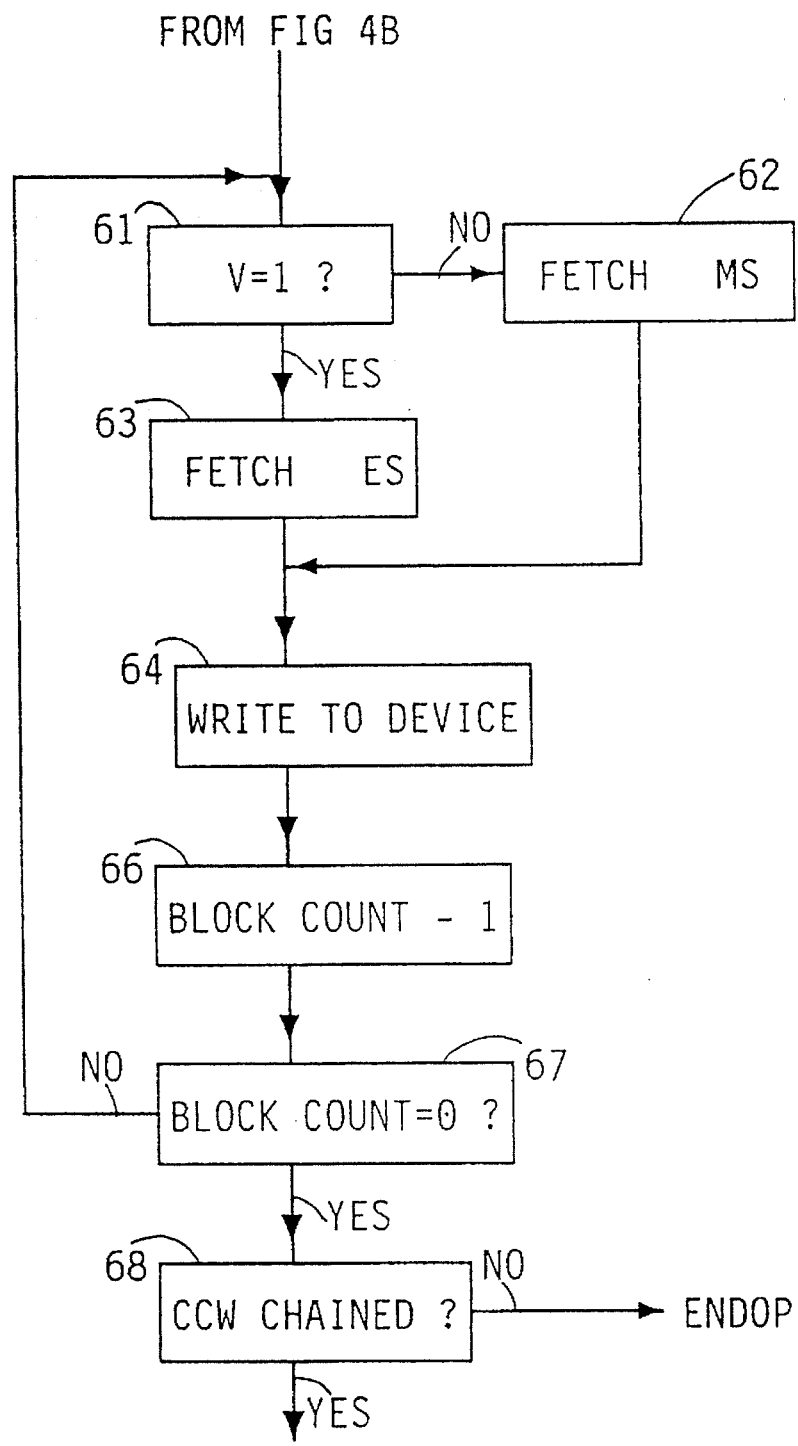
Figure 4D:
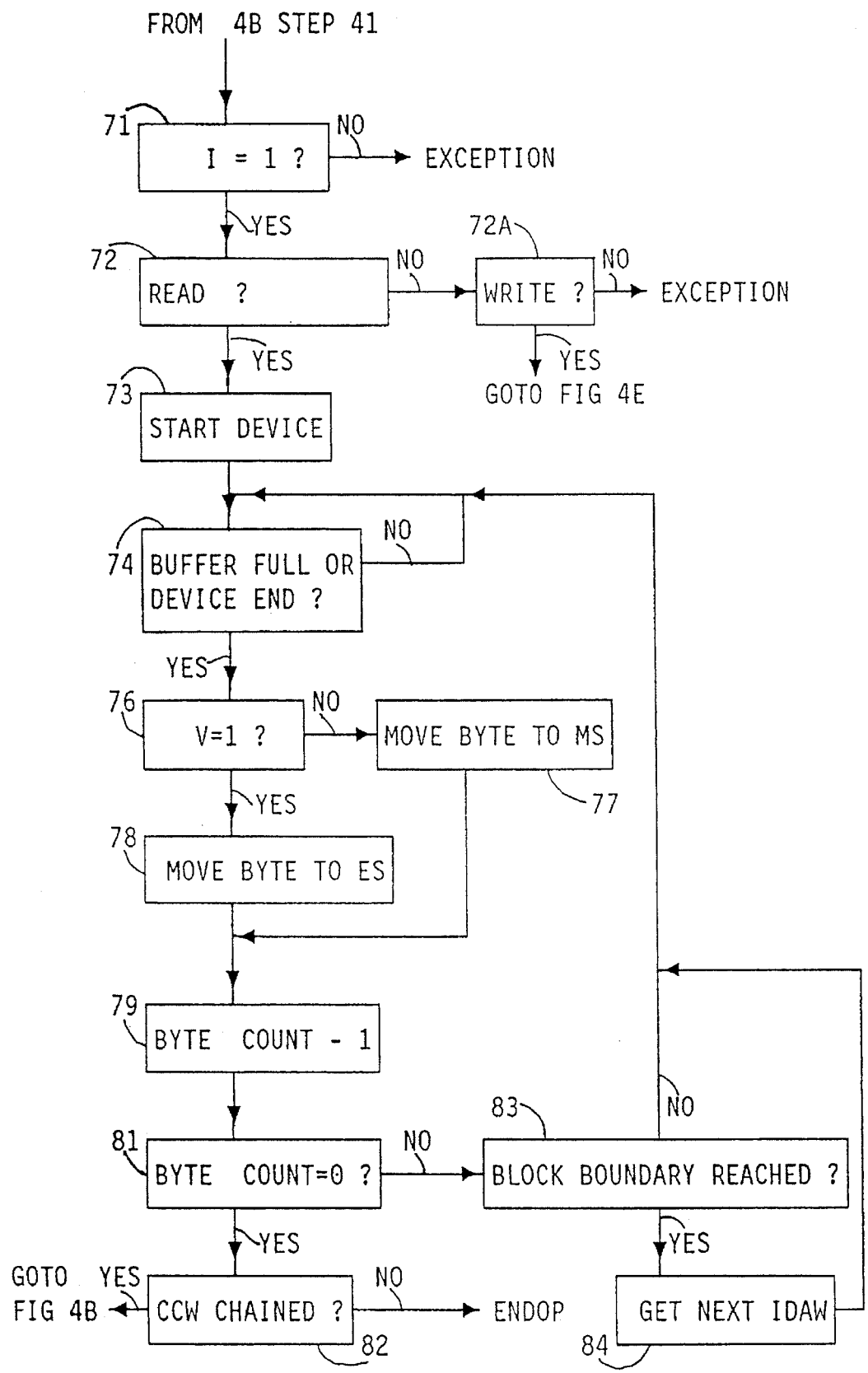

If step 44 found a write op code, FIG. 4C is entered to control a transfer similar to that done by steps 47–54, but for a data transfer in the other direction, i.e. from MS or ES to the I/O device. Thus, step 61 detects the state of the V bit in the current IDAW to determine if the transfer is from MS or ES. If V=0, the transfer is from MS, and step 62 is entered to perform it. If V=1, the transfer is from ES, and step 63 is entered to perform it. Then, step 64 writes the data to the I/O device, and the CCW block count is decremented by step 66. Step 67 test the block count for a zero value to determine if execution for the current CCW is completed. If zero, step 68 tests if there is another CCW in the channel program, and if not the process is ended (endop).

If step 67 finds a non-zero value, the execution continues for the current CCW by branching to step 61 and fetching the next IDAW in the list and testing its V bit to repeat the process until step 67 finds a zero count which indicates the last IDAW in the list has been executed.

When the last IDAW is detected by step 67, step 68 detects if more CCW exists in the channel program. If so, a branch is taken to FIG. 4B to step 40 which gets the next CCW, and the process is repeated for it, etc. until the end of the channel program is reached.

IDAWs WITH BYTE ADDRESSING:

FIG. 4D is entered for a current CCW when byte addressing is indicated in the CCW. This occurs when step 71 in FIG. 4D is entered from the no path of step 41 in FIG. 4B when CM=0 is detected in the current CCW to indicate that byte addressing is used in the CCW and in its IDAWs. Step 71 tests the I bit in the current CCW. If I=1, step 72 is entered. If step 71 indicates I=0, an exception is signalled to generate a process interruption, because D=0 indicates a small IDAW being used for byte addressing, which is not allowed in the preferred embodiment.

Figure 4E:
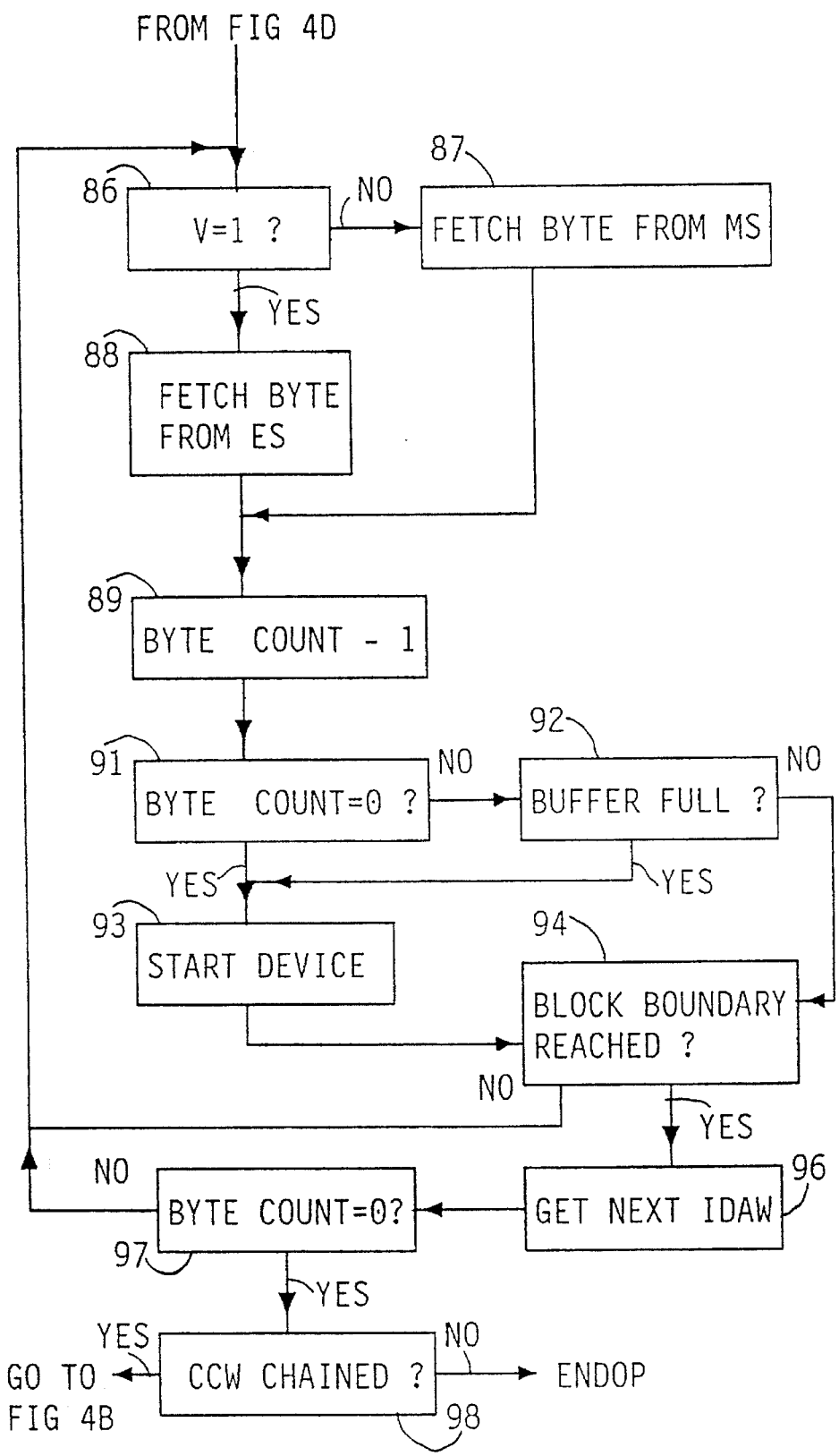

Step 72 tests for a read op code in the current CCW. If step 72 detects a read op code in the CCW, and if found step 73 is entered to have the channel processor send a signal on the channel to the device controller to start the device in a reading operation, which is the device specified in the ORB information. If no read op code is detected by step 72, step 72A tests the CCW for a write op code. If a write op code is detected, FIG. 4E is entered to continue the process.

If neither a read nor a write op code is specified in the CCW, the no exit from step 72A is taken, because no IDAW list is specified by a CCW other than a read or write CCW. Then an exception signal is provided to generate a program interruption, because this process is entered only for a read or write CCW.

After step 73 starts the device, it performs a read operation which transfers data from the device to a I/O buffer. Step 74 detects when the buffer is full or if a device end signal has occurred to indicate the device's read operation has ended. If either of these conditions has happened, the data in the I/O buffer is ready to be transmitted to MS or ES, which is controlled by an IDAW. Step 76 represents accessing of the next IDAW in the IDAW list (which is initially the first IDAW in the list), and tests the V bit in the IDAW. If V=0, step 77 transfers the next data byte from the I/O buffer to MS. If V=1, step 78 transfers the byte from the buffer to ES.

After the byte transfer is completed, step 79 decrements the block count of the CCW by one, and step 81 tests the resulting byte count for a zero value (which would indicate the current IDAW operation is completed). If the block count is not zero, step 83 is entered to determine if the currently transferred byte has reached the next block boundary. Either of these conditions indicates the current IDAW operation is completed. If the current IDAW operation is completed, step 84 is entered to get the next IDAW, and then step 74 is entered for processing the next IDAW to control the next data read from the I/O device into the I/O buffer.

But when the count is not yet zero, and when step 83 finds a block boundary has not been reached, processing continues for the same IDAW by again entering step 74 to repeat the process for controlling the transfer of the next byte of data read into the I/O buffer, etc., until either step 81 finds the count has reached zero, or step 83 detects a block boundary has been reached. Step 82 is entered when the count reaches zero to test if the end of the channel program has been reached (no chained CCW). When the end of the channel program is reached, the process is ended (endop). If step 82 detects chaining to another CCW, step 40 in FIG. 4B is entered to obtain the next CCW in the channel program and to continue the process in the above described manner until the end of the channel program is reached.

Step 86 in FIG. 4E is entered if step 72A in FIG. 4D detects a write op code in the current CCW to control a data transfer similar to that done by steps 76–83, except the data transfer is in the other direction, i.e. from MS or ES to the I/O device. The first IDAW is fetched in the list addressed by the CCW, and its V bit is detected by step 86. If V=0, step 87 is entered to transfer the next byte fetched from MS to the I/O buffer. If V=1, step 88 is entered to transfer the next byte fetched from ES to the I/O buffer.

Then, step 89 decrements the CCW byte count, and step 91 tests the byte count for a zero value. If zero, all byte transfers for the current CCW are completed, and step 93 is entered to start the I/O device to write the data in the buffer onto the medium in the I/O device. If step 91 finds the byte count is not zero, step 92 next determines if the buffer is full. If full, step 93 is entered to start the device to write the data in the buffer onto the medium in the I/O device. Then step 94 is entered to detect if a block boundary has been reached.

If a block boundary is reached, the execution for the current IDAW is completed, and the next steps 96 and 97 obtain any next IDAW in the current list if the current IDAW is not the last in the list (which is indicated if step 97 indicates the byte count is zero).

If step 91 finds the byte count is not zero, step 92 finds the buffer is not full, and step 94 finds a block boundary has not been reached, then the execution for the current IDAW is not completed, and the byte transfers continue for the current IDAW. Then, step 86 is again entered to handle the transfer of the next byte for the current IDAW.

If step 94 finds a boundary has been reached, the execution for the current IDAW is completed, and then step 96 starts an access to get the next IDAW, followed by step 97 testing for a zero byte count for the CCW.

If step 97 finds the CCW byte count is not zero, step 86 is again entered to execute the next CCW being fetched by step 96. But if step 97 finds the byte count is zero, step 98 is entered to test if the current CCW is chained to a next CCW. If chained, step 40 in FIG. 4B is again entered for processing the next CCW. But if step 98 finds there is no other CCW in the channel program, the process is ended (endop).

MULTIPLICITY OF IDAW FORMATS:

An advantage in having byte addressing of ES is that byte addressing makes possible the direct packing of a multiplicity of small I/O data transfers into a single block in ES without involving MS in the packing operation.

Byte addressing in ES is provided by one of the forms of the 64 bit IDAW shown in FIG. 2. Byte addressing is provided when control bit D=1 in the ORB which locates the channel program, and when the IDAW has V=1, as shown as in IDAW 19. Thus, IDAW 19 requires its control bit V (at bit location 0 in the IDAW) to be set to V=1 to indicate that the IDAW is performing byte addressing in ES. IDAW 19 contains an ESBN field in bit positions 1–51, and a byte address field in bit positions 52–63 that locates a byte in the block specified in the ESBN field. A block commonly has a 2 KB or 4 KB data size in both MS and ES.

If a 64 bit IDAW has V=0, then IDAW 18 is indicated which contains a 63 bit byte address field in its bit locations 1–63 which addresses MS.

When D=0 in the ORB, a 32 bit IDAW is provided having a 31 bit address field in its bit positions 1–31. The 32 bit IDAWs are shown in FIG. 2 as IDAW 16 and IDAW 17.

IDAW 16 is formed when V=0 to contain a byte address in MS, and IDAW 17 is formed when V=1 to contain an ES block address number (ESBN).

When V=1, the IDAW (whether 32 or 64 bit size) specifies an ES block number, but only the 64 bit size IDAW is capable of byte addressing in the block in the preferred embodiment. The V=1 31 bit IDAW form can only control the transfer of whole blocks to or from ES.

The form of IDAW 19 controls a data transfer in the specified block in ES from the addressed byte location for a contiguous number of bytes equal to the value in the count field of the CCW controlling the IDAW transfer, but not exceeding the next block boundary. The next IDAW in the list is used when the CCW count crosses the next block boundary. Thus, the IDAW being executed when the CCW count is exhausted is the last IDAW in the current list.

If a CCW addresses an IDAW which is controlling a byte transfer to MS or ES, and the CCW byte count is exhausted before the next block boundary is reached, that IDAW is the only IDAW in that CCW's IDAW list. This type of IDAW list may be called the "single IDAW list".

ES BLOCK DATA PACKING:

Prior systems did not provide for packing ES blocks (page frames). The packing function is done by a plurality of CCWs in a channel program to control a transfer of data to/from non-contiguous locations in an I/O device from/to locations within a single specified block in ES.

The packing of a block in ES is done by using a plurality of CCWs, each CCW having single IDAW list containing an V=1 64 bit IDAW 19 of the type shown in FIG. 2.

Figure 3A:
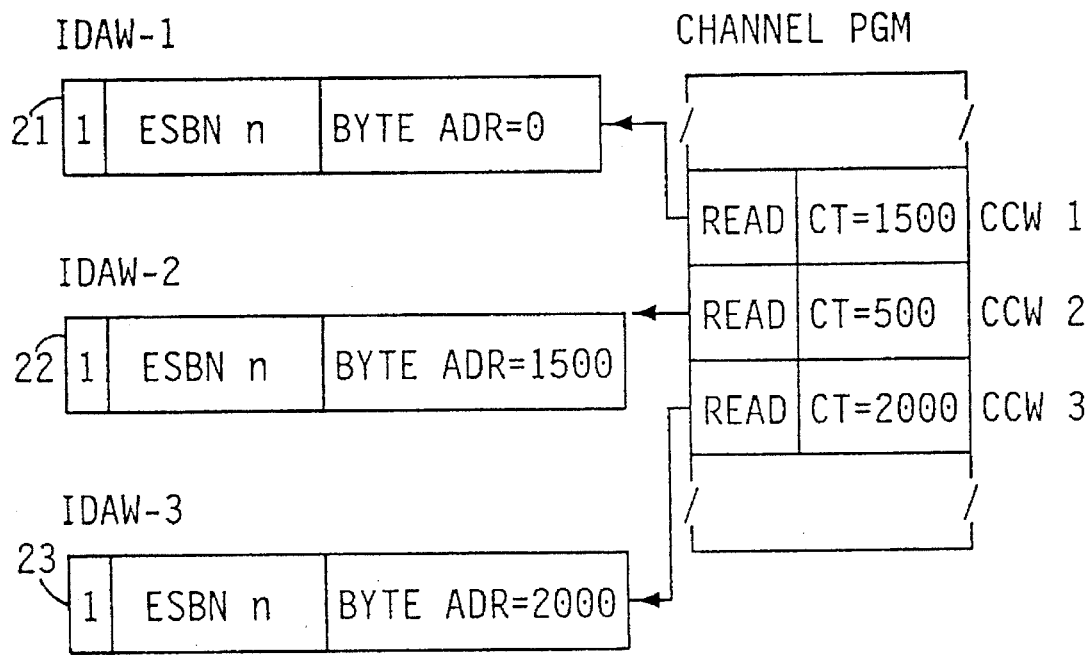
FIG. 3A shows an example of a channel program.
Figure 3B:
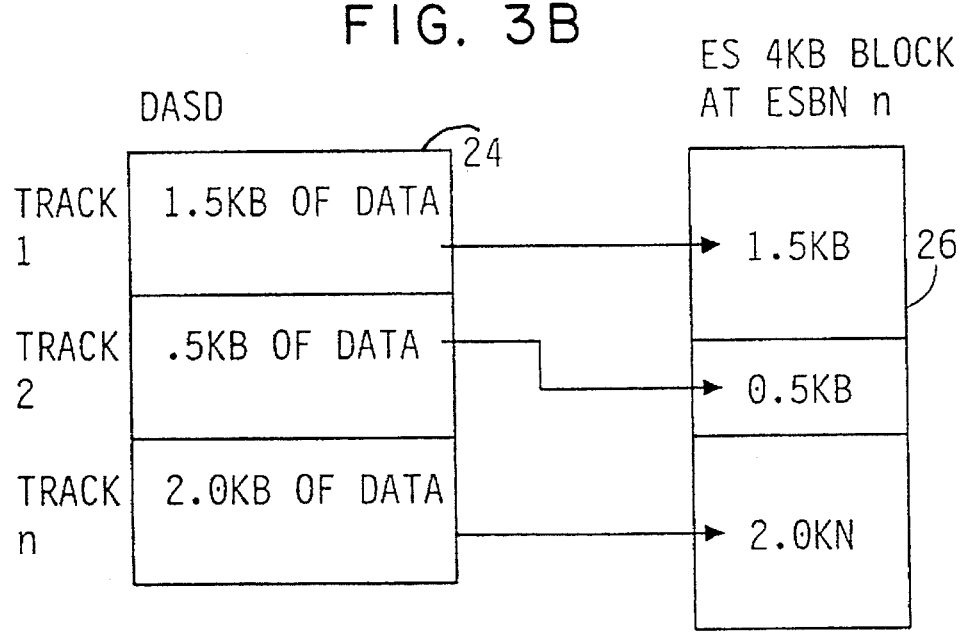
FIG. 3B shows an non-contiguous data locations being read in different tracks on a DASD.

FIG. 3A shows an example of a channel program for performing packing in an ES block. CCW-1 has an IDAW list comprising only IDAW-1, CCW-2 has a list comprising only IDAW-2, and CCW-3 has a list comprising only IDAW-3. Each of these IDAWs has a read op code. FIG. 3B shows non-contiguous data locations being read in different tracks on a DASD (disk) which are respectively controlled by the CCWs 1–3 and their respective single IDAW lists.

Thus, the first CCW-1 contains a count of 1500 bytes, and its IDAW-1 controls a transfer of bytes from track 1 which are written in ES block number (ESBN) n, beginning at the ES block address 0 indicated in the associated IDAW-1. The writing of transferred bytes continues contiguously in the ES block until the CCW byte count of 1500 is exhausted, and these bytes are stored in the first 1500 byte locations in the ES block. Then the next CCW-2 is executed, along with its IDAW-2, for transferring 500 bytes from track 2 in the I/O device into the ES block from its location 1500 indicated in IDAW-2 for the next 500 bytes controlled by the byte count in CCW-2. Finally, the last CCW-3 is executed, along with its IDAW-3, for transferring 2000 bytes from track 3 in the I/O device into the ES block from its location 2000 indicated in IDAW-3 for the next 2000 bytes controlled by the byte count in CCW-3.

Accordingly, the ES block is packed in this manner by the illustrated embodiment.

Many variations and modifications are shown which do not depart from the scope and spirit of the invention and will now become apparent to those of skill in the art. Thus, it should be understood that the above described embodiments have been provided by way of example rather than as a limitation.

Having thus described our invention, what we claim as new and desire to secure by Letters Patent is:

1. A method of enabling an I/O device under control of a channel program to directly transfer data to/from any of a plurality of electronic storage media in a data processing system, comprising the steps of executing the channel program by an I/O subsystem of the data processing system, the channel program including channel control words (CCWs), including CCWs specifying a read or write operation and containing an IDAW (indirect data address word) control bit for indicating whether an address in the CCW points to an IDAW list containing one or more IDAWs, accessing the IDAW list addressed by a current CCW in the channel program, detecting a current IDAW beginning with a first IDAW in the IDAW list, including detecting a state of a storage selection control field (V) in the current IDAW to identify one of the electronic storage media under control of the current IDAW, and an address contained in the current IDAW for addressing a location in the identified electronic storage media, dynamically controlling switching between different electronic storage media by providing an electronic storage identification in each IDAW in the IDAW list to control media switching independently of the electronic storage identification in any other IDAW in the IDAW list, and transferring the data between the I/O device and the location in the electronic storage medium identified in the current IDAW.

2. A method of enabling an I/O device under control of a channel program to directly transfer data to/from any of a plurality of electronic storage media in a data processing system as defined in claim 1, further comprising the steps of:

executing a start subchannel instruction by a central processor in the data processing system to address an operation request block (ORB) containing an address for starting the channel control program to enable the central processor to control execution of the channel program, and indicating by a setting in a plural-electronic-storage field (E) in the ORB whether the channel program can contain IDAWs capable of accessing any of the plurality of electronic storage media including an MS (main storage) of the data processing system.

3. A method of enabling an I/O device under control of a channel program to directly transfer data to/from any of a plurality of electronic storage media in a data processing system as defined in claim 2, further comprising the step of:

indicating in an IDAW-size control field (D) in the ORB whether large IDAWs (compared to another IDAW size) can exist in the channel program, the large IDAWs containing a large byte address for accessing any byte location in an ES (expanded storage) medium which is the electronic storage medium for expanding the capacity of the MS.

4. A method of enabling an I/O device under control of a channel program to directly transfer data to/from any of a plurality of electronic storage media in a data processing system as defined in claim 3, further comprising the step of:

structuring each read and write CCW in the channel program with an ES byte control field (CM) to indicate when an ES byte address is provided in each of the large IDAWs in the IDAW list addressed by the CCW.

5. A method of enabling an I/O device under control of a channel program to directly transfer data to/from any of a plurality of electronic storage media in a data processing system as defined in claim 4, further comprising the step of:

also structuring each read or write CCW in the channel program with a count field (CNT) to indicate the size of a data transfer controlled by the IDAW list addressed by the CCW, and controlling the number of IDAWs executed in the IDAW list by a value in the count field of the current CCW.

6. A method of enabling an I/O device under control of a channel program to directly transfer data to/from any of a plurality of electronic storage media in a data processing system as defined in claim 5, further comprising the step of:

having the ES byte control field (CM) in the current CCW indicate an ES byte count exists in the count field (CNT) in the CCW when a large IDAW size exists in the IDAW list for which the count field controls the number of IDAW(s) to be executed in the IDAW list.

7. A method of enabling an I/O device under control of a channel program to directly transfer data to/from any of a plurality of electronic storage media in a data processing system as defined in claim 6, further comprising the step of:

ending the execution of IDAWs in the IDAW list when a count of transferred bytes equals the value in the count field in the current CCW.

8. A method of enabling an I/O device under control of a channel program to directly transfer data to/from any of a plurality of electronic storage media in a data processing system as defined in claim 7, further comprising the step of:

obtaining any next CCW in the channel program when execution is ended for the IDAW in the IDAW list.

9. A method of enabling an I/O device under control of a channel program to directly transfer data to/from any of a plurality of electronic storage media in a data processing system as defined in claim 5, further comprising the step of:

indicating in a byte control field (CM) in a current CCW if an ES block count exists in the count field (CNT) in the current CCW when a large IDAW size exists in the IDAW list for which the count field indicates the number of IDAW(s) to be executed in the IDAW list.

10. A method of enabling an I/O device under control of a channel program to directly transfer data to/from any of a plurality of electronic storage media in a data processing system as defined in claim 5, further comprising the step of:

indicating in a byte control field (CM) in the CCW that an ES block count exists in the count field (CNT) in the current CCW when a small IDAW size is indicated for IDAWs in the IDAW list for which the count field controls the number of IDAW(s) to be executed in the IDAW list, and executing the next IDAW in the IDAW list when a block boundary is reached in a byte count of transferred bytes and the byte count does not exceed the value in the count field in the current CCW.

11. A method of enabling an I/O device under control of a channel program to directly transfer data to/from any of a plurality of electronic storage media in a data processing system as defined in claim 10, further comprising the step of:

ending the execution of IDAWs in the IDAW list when a count of transferred bytes equals a value in the count field in the current CCW.

12. A method of enabling an I/O device under control of a channel program to directly transfer data to any of a plurality of electronic storage media in a data processing system as defined in claim 11, further comprising the step of:

obtaining any next CCW in the channel program when execution is ended for the IDAW list.

13. A method of enabling an I/O device under control of a channel program to directly transfer data to/from any of a plurality of electronic storage media in a data processing system as defined in claim 5, further comprising the step of:

accessing data only in MS when the ORB indicates a small IDAW size and the plural electronic storage media are not indicated as being accessible.

14. A method of enabling an I/O device under control of a channel program to directly transfer data to/from any of a plurality of electronic storage media in a data processing system as defined in claim 5, further comprising the step of:

signalling an exception condition when a large IDAW size is indicated to exist for IDAWs in the IDAW list while indicating in the ORB that the channel program can not contain IDAWs for accessing plural electronic storage media.

15. A method of enabling an I/O device under control of a channel program to directly transfer data between the I/O device and any of a plurality of electronic storage media in a data processing system as defined in claim 12, further comprising the step of:

accessing IDAWs in the IDAW list addressed by a read CCW to control a transfer of header data from an I/O disk device to MS and to control a transfer to ES of record data which is alternately located on the I/O disk device at locations respectively adjacent to the header data.

16. A method of enabling an I/O device under control of a channel program to directly transfer data between an I/O device and any of a plurality of electronic storage media in a data processing system as defined in claim 12, further comprising the step of:

alternately accessing MS and ES under control of the IDAWs in the IDAW list addressed by a write CCW to transfer header data from MS to respective header fields on a I/O disk device and to transfer associated record data from ES to record fields respectively adjacent to the header fields on the I/O disk device.

17. A method of enabling an I/O device under control of a channel program to directly transfer data to/from any of a plurality of electronic storage media in a data processing system as defined in claim 1, further comprising the steps of:

transferring up to a 4 KiloByte block with each IDAW in an IDAW list.

18. A method of enabling an I/O device under control of a channel program to directly transfer data to/from any of a plurality of electronic storage media in a data processing system as defined in claim 1, further comprising the steps of:

transferring up to a 2 KiloByte block with each IDAW in the IDAW list.

\* \* \* \* \*